(12) United States Patent
Kolossow

(10) Patent No.: US 7,556,020 B2
(45) Date of Patent: Jul. 7, 2009

(54) STARTING DEVICE FOR INTERNAL COMBUSTION ENGINES AND METHOD THEREFOR

(75) Inventor: Sascha Kolossow, Hamburg (DE)

(73) Assignee: DOLMAR GmbH, Hamburg (DE)

( * ) Notice: Subject to any disclaimer, the term of this patent is extended or adjusted under 35 U.S.C. 154(b) by 271 days.

(21) Appl. No.: 11/609,548

(22) Filed: Dec. 12, 2006

(65) Prior Publication Data

US 2008/0163851 A1    Jul. 10, 2008

(30) Foreign Application Priority Data

Dec. 22, 2005    (DE) .................. 20 2005 020 147 U

(51) Int. Cl.
  *F02N 17/00*    (2006.01)
  *F02P 5/06*    (2006.01)
(52) U.S. Cl. ............................... 123/406.54; 123/179.5
(58) Field of Classification Search ............ 123/406.53, 123/406.54, 179.5, 339.11, 406.24
  See application file for complete search history.

(56) References Cited

U.S. PATENT DOCUMENTS

| | | | | |
|---|---|---|---|---|
| 4,244,336 A | * | 1/1981 | Fitzner | 123/406.57 |
| 4,306,536 A | * | 12/1981 | Fitzner | 123/406.57 |
| 4,318,387 A | * | 3/1982 | Fitzner | 123/406.66 |
| 4,378,770 A | * | 4/1983 | Ikeura | 123/406.53 |
| 4,445,477 A | * | 5/1984 | Ikeura | 123/406.53 |
| 4,633,834 A | * | 1/1987 | Takeuchi et al. | 123/406.53 |
| 5,280,772 A | * | 1/1994 | Weber et al. | 123/339.11 |
| 5,513,607 A | | 5/1996 | Doragrip et al. | |
| 5,775,297 A | * | 7/1998 | Koike et al. | 123/406.51 |
| 6,223,723 B1 | * | 5/2001 | Ito | 123/406.51 |
| 6,314,938 B1 | * | 11/2001 | McCreery et al. | 123/406.56 |
| 6,761,148 B2 | | 7/2004 | Kiessling | |

FOREIGN PATENT DOCUMENTS

DE    195 32 205 A1    3/1996
DE    102 01 422 A1    3/2003

* cited by examiner

*Primary Examiner*—Hai H Huynh
(74) *Attorney, Agent, or Firm*—Kelly Lowry & Kelley, LLP

(57) ABSTRACT

The present invention relates to a method for starting an internal combustion engine using a starting device, an ignition spark from a spark plug of an internal combustion engine being controllable by the starting device as a function of the speed of the crankshaft, a progressive rise of the advance of the ignition angle before top dead center already being performed as a function of the crankshaft speed at low speeds below the idle speed, which is followed at rising crankshaft speed by a sudden drop of the advance of the ignition angle to a plateau of the idle speed range.

22 Claims, 6 Drawing Sheets

|  |  |
|---|---|
| 200 |  |
| 400 | 0 |
| 500 | -2 |
| 700 | -6 |
| 1000 | -10 |
| 1400 | -14 |
| 1500 | -15 |
| 2000 | -18 |
| 2300 | -19 |
| 2300 | -12 |
| 2500 | -11 |
| 3000 | -10 |
| 4000 | -9,5 |
| 4000 | -21 |
| 5000 | -22 |
| 6000 | -22 |
| 7000 | -22 |
| 8000 | -22 |
| 9000 | -23 |
| 10000 | -23 |
| 11000 | -23 |
| 12500 | -23 |
| 13500 | -10 |

STARTING DEVICE FOR INTERNAL COMBUSTION ENGINES AND METHOD THEREFOR

TECHNICAL FIELD

The present invention relates to a method for a starting device for internal combustion engines as well as such a starting device.

PRIOR ART

In internal combustion engines, engine starting using cable pull starters is known. In this case, an internal combustion engine is started by pulling on the cable pull of the cable pull starter as rapidly as possible. In particular in internal combustion engines having fewer than four cylinders, the initial force to be applied by the operator when pulling through the cable pull or the required cable pull velocity is large in order to be successful when starting the internal combustion engine. However, many operators are subject to great bodily stress or even overloaded by these requirements, so that a successful engine start often does not occur and/or many attempts are required for this purpose before the internal combustion engine is successfully started. There is also the danger of bodily impairment of the operator due to the high bodily requirements.

These high loads occur in particular with internal combustion engines typically having fewer than four cylinders, the compression work upon rotation of the crankshaft being assumed directly by the operator and the corresponding force curves occurring intermittently or also pulsed.

Furthermore, high seals between the cylinder bore and the piston are achieved because of the modern cylinder manufacturing methods, so that the cylinder filling to be compressed no longer reduces noticeably because of lower leakage rates.

In addition, because of the compact installation space situations, internal combustion engines having relatively short connecting rods occur more and more frequently. Because of the lever ratios in the crank drive of the internal combustion engines, this also causes unfavorable force curves to result when cranking the crankshaft.

Modern internal combustion engines are also operated at high compression, which results in a lower pollutant content of the exhaust gas. However, this also in turn causes the compression work to be elevated in internal combustion engines designed in this way.

For the purpose of the lowest possible specific exhaust gas pollutant emission and for better exploitation of high-quality fuels, modern internal combustion engines are operated, down into the starting and idle range, using moments of ignition far before the top dead center (TDC) of the crankshaft. However, this may also result in backward rotation of the crankshaft if the cable pull starter is handled clumsily by the operator. This causes the cable pull of the starter cable having the associated handle to be retracted, which is generally perceived as an unpleasant back kick by the operator. To avoid this back kick in the prior art, in the event of too slow speeds below a starting speed, the ignition system is implemented in such a way that an ignition voltage sufficient for a flashover is not provided at the spark plug. Therefore, a high speed of the cable pull starter corresponding to a starting speed is required to start the internal combustion engine. In addition, the speed limit from which an ignition spark is generated is relatively high. Therefore, the operator must generate a high velocity of the cable pull and thus apply a relatively high initial force to the cable pull.

DESCRIPTION OF THE INVENTION, OBJECT, ACHIEVEMENT, ADVANTAGES

The object of the present invention is to provide a method for a starting device for internal combustion engines as well as such a starting device which provides a significant relief of the operator. It is also a partial object in internal combustion engines having cable pull starters to reduce the required pull velocity of the cable pull and/or the pull acceleration at the beginning of the starting procedure and thus to reduce the force required when pulling the cable pull.

The object is achieved in regard to the method according to the present invention according to the features of Claim 1. The object in regard to the starting device is advantageously achieved by the features of Claim 14 or Claim 30.

Advantageous refinements are each described in the subclaims.

BRIEF DESCRIPTION OF THE DRAWING

In the following, the present invention is described in greater detail on the basis of an exemplary embodiment with reference to the drawing. In purely schematic illustrations:

FIG. 6 shows a table of an ignition angle before engine TDC according to the present invention and the speed of the internal combustion engine.

PREFERRED EMBODIMENT OF THE INVENTION

Figure 1A:
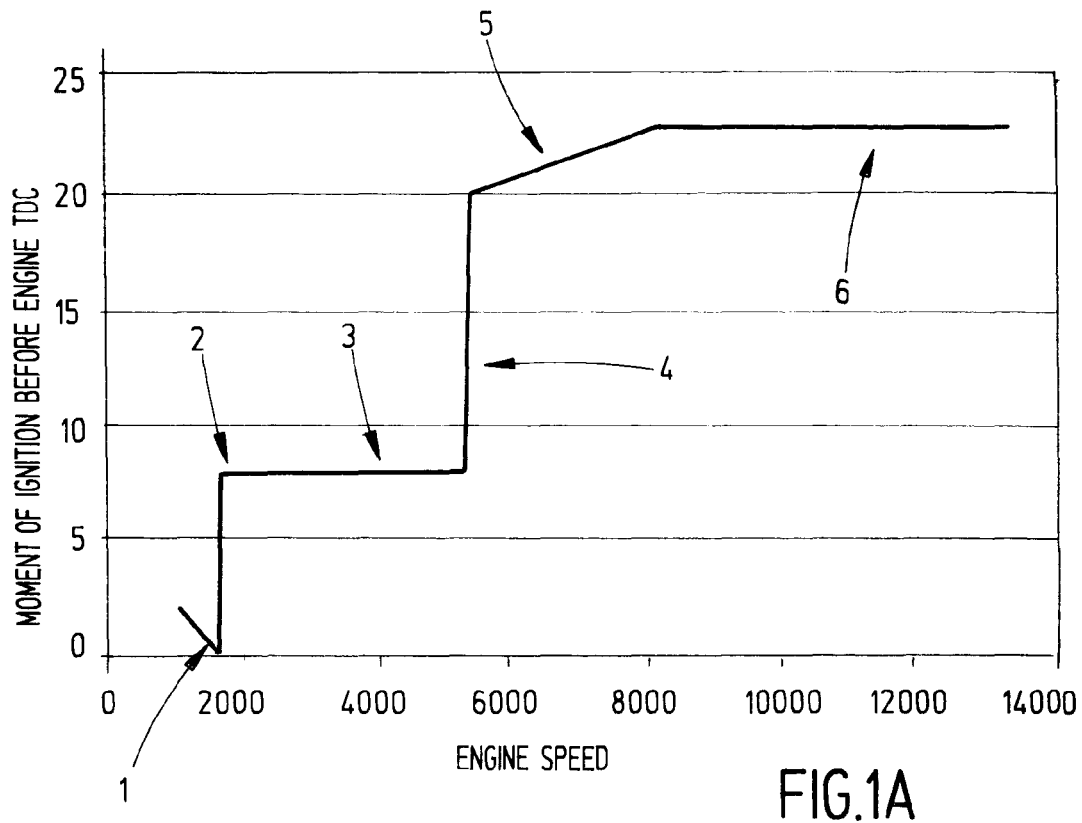
FIG. 1a shows a diagram of a moment of ignition before engine TDC as a function of the engine speed of the internal combustion engine according to the prior art.

FIG. 1a shows a diagram of the moment of ignition before engine TDC of an internal combustion engine as a function of the engine speed according to the prior art. It may be seen that below approximately 1000 rpm, no ignition spark arises. From approximately 1000 rpm to approximately 1750 rpm, it may be seen in a part of the curve that the moment of ignition before the top dead center (engine TDC) is low overall and decreases to approximately zero with increasing speed, see reference numeral 1. At a first limit speed 2, the moment of ignition before engine TDC jumps to approximately 8° and remains constant to approximately 5000 rpm, see plateau 3.

Subsequently, the moment of ignition before engine TDC again jumps to approximately 20° at higher speeds at 4 and then slowly rises in curve part 5 until a plateau 6 is reached at approximately 8000 rpm.

The first plateau 3 corresponds to the speed range from approximately 5000 rpm to approximately 550 rpm and the idle range. Below the idle range, no significant moment of ignition before TDC is provided, since in this lower speed range, a back kick of the crankshaft is to be avoided by implementing the ignition system in such a way that an ignition voltage sufficient for a flashover at the spark plug is not provided at too low speeds below a starting speed.

Figure 1B:
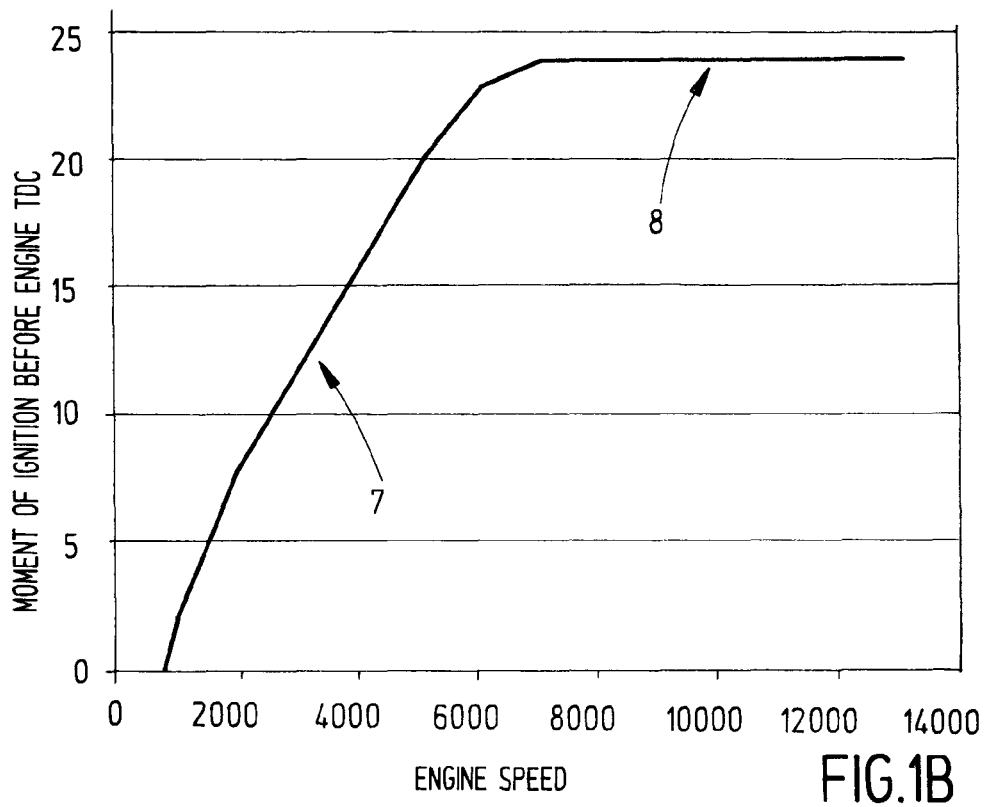
FIG. 1b shows a diagram of a moment of ignition before engine TDC as a function of the engine speed of the internal combustion engine according to the prior art having starting support.

FIG. 1*b* also shows a diagram of the moment of ignition before engine TDC of an internal combustion engine as a function of the engine speed according to the prior art. It may be seen that just below approximately 1000 rpm, no ignition spark arises, and from approximately 1000 rpm to approximately 6000 rpm, the moment of ignition before top dead center (engine TDC) rises with rising speed to a plateau of approximately 24°, see reference numerals 7 and 8.

Figure 2:
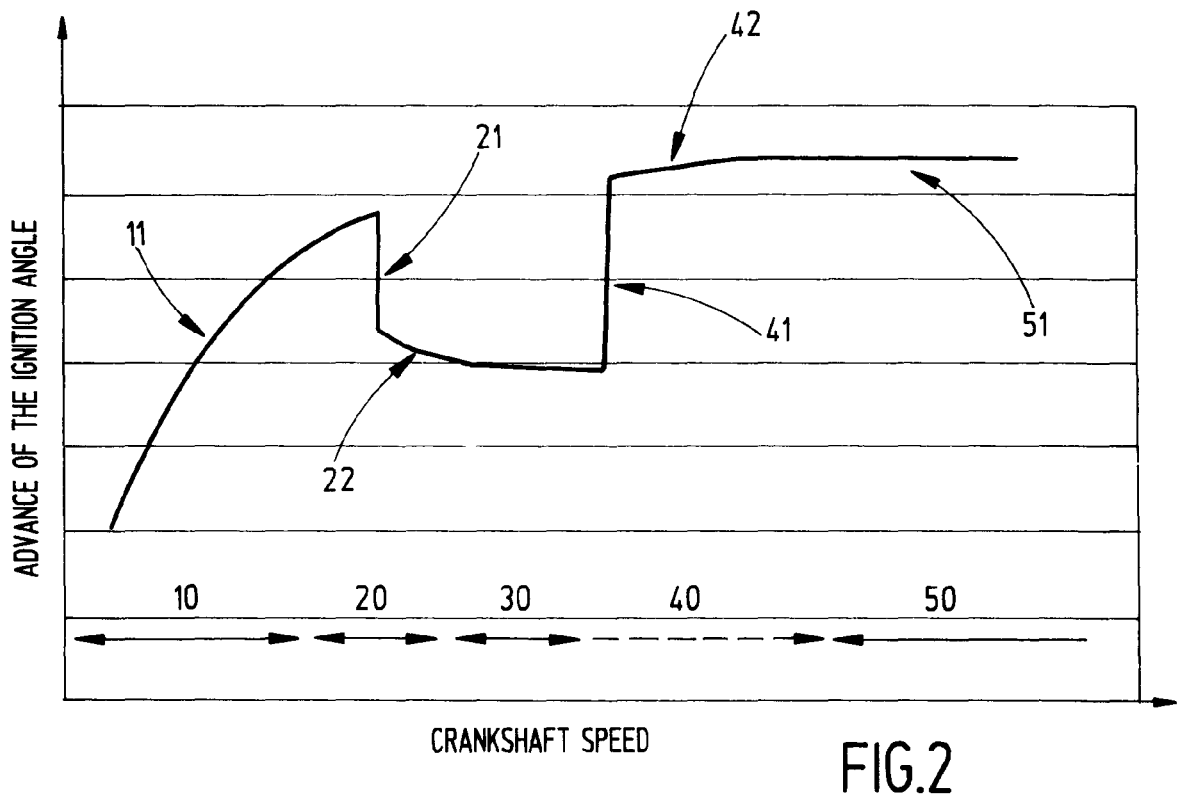
FIG. 2 shows a schematic diagram of a curve according to the present invention of the moment of ignition before engine TDC and/or the advance of the ignition angle as a function of the crankshaft speed of the internal combustion engine.

FIG. 2 schematically shows a diagram of the curve according to the present invention of the moment of ignition before engine TDC and/or the advance of the ignition angle as a function of the speed of the crankshaft of the internal combustion engine. Essentially five ranges may be recognized. In a first range 10, the advance of the ignition angle rises progressively from zero, see 11. The curve 11 approximately corresponds to a branch of an inverted parabola. The range 10 is the starting range. The range 20, which adjoins the range 10 at higher crankshaft speeds, is the range of idle stabilization. In this range, a sudden reduction 21 of the advance of the ignition angle occurs first and at higher speeds the advance again decreases slightly with increasing speed, see 22. The range 30, which adjoins the range 20 of idle stabilization, is the idle range, in which the advance is nearly constant or decreases slightly with rising speed. The range 40, which adjoins the idle range 30, is the acceleration range or deceleration range, and represents a transition from the idle range 30 to the work range 50. In this range 40, a sudden transition 41 of the advance having subsequent slight increase 42 with growing speed is implemented before a plateau 51 is reached as a work range at 50.

Figure 3:
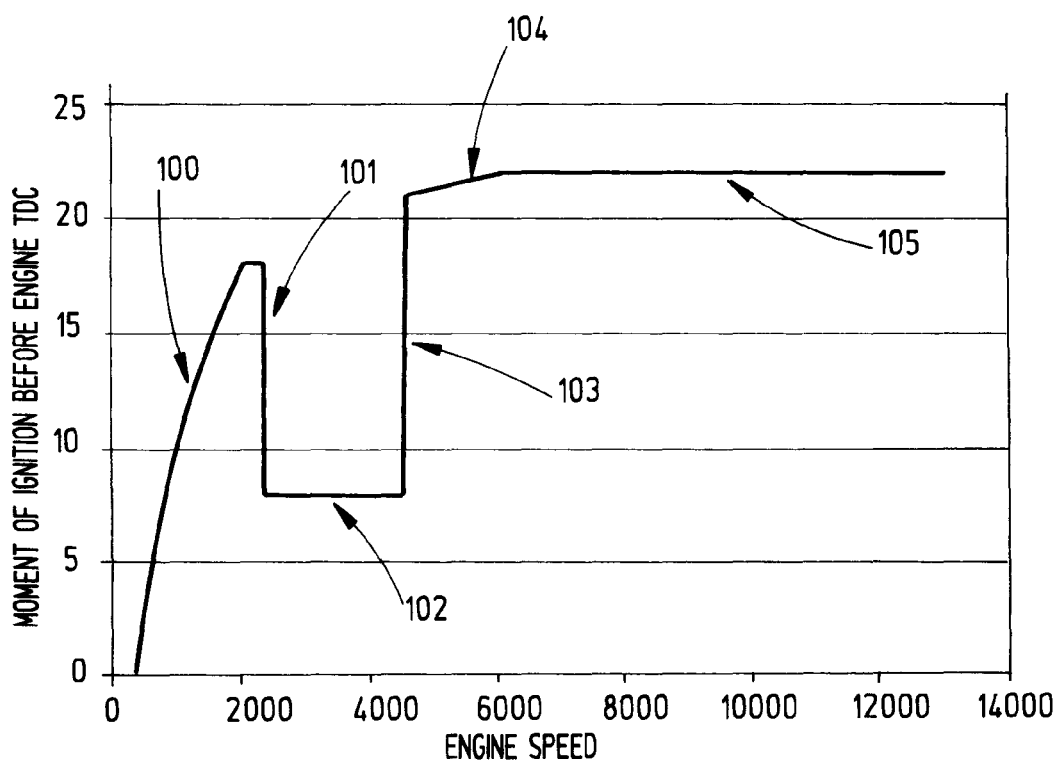
FIG. 3 shows a diagram of a curve according to the present invention of the moment of ignition before engine TDC as a function of the engine speed of the internal combustion engine without idle stabilization.

FIG. 3 shows a diagram of a curve according to the present invention of the moment of ignition before engine TDC of an internal combustion engine as a function of the engine speed. In contrast to the prior art according to FIG. 1*a*, in this diagram of FIG. 3 it may be seen that from approximately 400 rpm, a progressively rising moment of ignition 100 before engine TDC already exists. From approximately 400 rpm to approximately 2250 rpm, the value of the moment of ignition before top dead center (engine TDC) rises strongly with rising speed, a maximum value of approximately 18° being reached at approximately 2250 rpm. At this speed value, the value of the moment of ignition drops steeply from 18° to approximately 8° before engine TDC, see 101, and remains constant until approximately 4400 rpm, see curve part 102. The value of the moment of ignition subsequently jumps to approximately 22° before engine TDC again at approximately 4400 rpm, see curve part 103, and then again rises slowly, see curve part 104, until it has reached a plateau 105 at 6000 rpm.

It may be seen clearly in FIG. 3 that the ignition spark already starts at the lowest speed, i.e., the moment of ignition is thus set so that a back kick of the internal combustion engine may not occur, i.e., a moment of ignition having a very small distance before, after, or in the top dead center of the crankshaft. Furthermore, the moment of ignition has a large progression in the direction of the operating moment of ignition with rising starting speed and after reaching the idle speed and/or the idle speed range, a constant moment of ignition 102 for stable idle behavior of the internal combustion engine is set. The transition from the progressive rise to the first plateau 102 thus represents the transition from the idle speed range and the further rise at approximately 4400 rpm represents the transition 103 to the work speed range.

The curve according to the present invention of the moment of ignition as a function of the engine speed and/or crankshaft speed in an ignition system according to the present invention causes the following. During slow pulling through of the cable pull starter via the compression of the internal combustion engine, the ignition occurs at a very late moment of ignition, so that the internal combustion engine may not kick back, the energy being released by the combustion of the cylinder filling accelerating the crank drive. However, because of the physical limits, the acceleration in this range is typically not yet sufficient to reach independent achievement of the idle speed. However, the operator is supported by the slight acceleration during the further pulling through of the starter cable, so that during the next crankshaft rotations, he perceives the force peaks caused by compression only slightly or not at all, and the further curve of the force up to the complete withdrawal of the cable is represented to him as strongly regressive because of the progressively running moment of ignition. The arm force no longer required is converted into an acceleration movement, so that the starter handle of the cable pull starter may be pulled more and more rapidly in the curve until reaching the cable end in the completely withdrawn state. Therefore, under favorable circumstances, a sufficiently high speed of the crank drive of the internal combustion engine and a sufficiently earlier moment of ignition before the top dead center of the crank drive may be achieved far before reaching the cable end, so that the internal combustion engine starts and reaches the idle speed. Overall, a significant reduction of the cable pull velocity for successfully starting the internal combustion engine is thus achieved. This also causes a significant reduction of the force required for this purpose, because force peaks no longer occur, as in the rapid pulling through according to the prior art.

The idle range is stabilized by a reduction of the moment of ignition in relation to the moment of ignition in the work range and the moment of ignition in the upper starting range. This causes the internal combustion engine to have to be unthrottled relatively strongly to achieve its operating point. The fuel/air mixture quantity taken and in the inaccuracies frequently occurring during the mixture formation thus sink into the background by percentage. For the case that the internal combustion engine would drop in its speed during the idle phase due to internal or external excitations, i.e., would decrease in speed, the internal combustion engine would be automatically accelerated back to the idle speed with the drop to the upper starting speed because of the suddenly rising advanced ignition angle.

Figure 4:
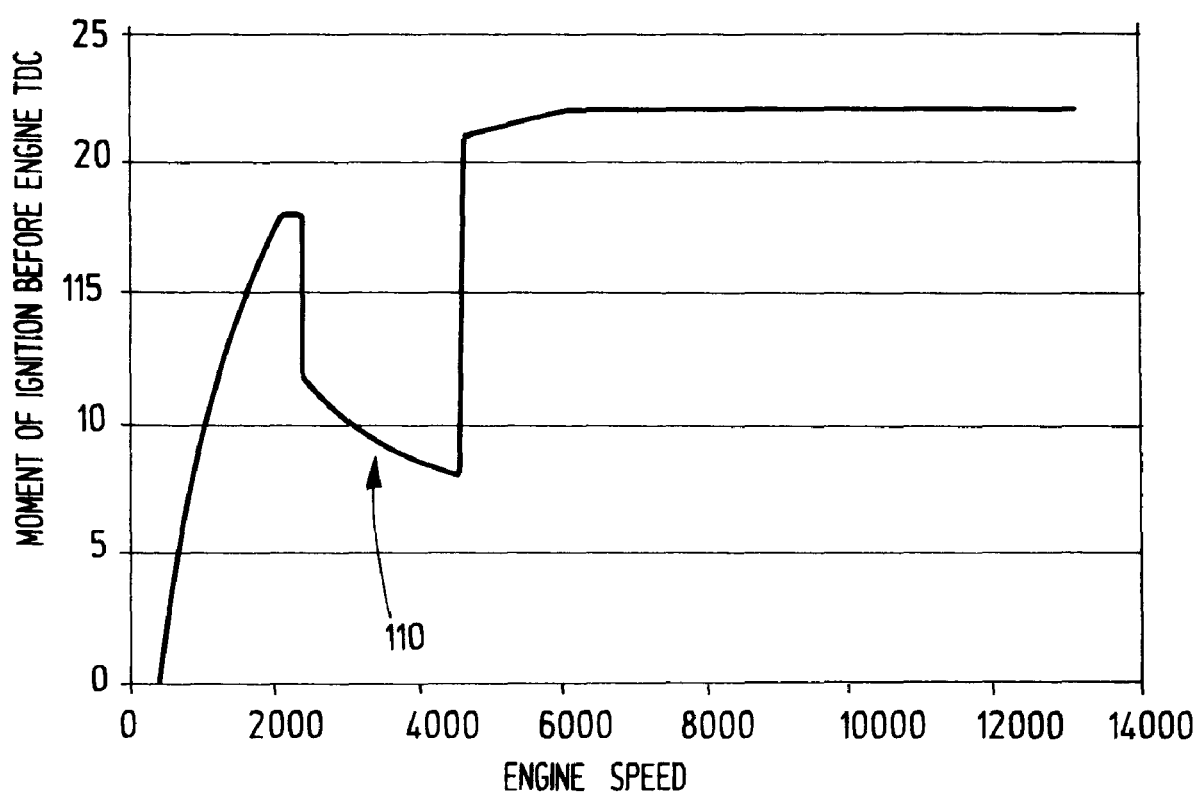
FIG. 4 shows a diagram of a curve according to the present invention of the moment of ignition before engine TDC as a function of the engine speed of the internal combustion engine with idle stabilization.

In addition to the effect of self-regulation described above as the idle speed subsides, furthermore, a regressive curve of the ignition angle in the idle range may be performed, as shown in FIGS. 2 and 4. The idle range is provided therein with an ignition angle and/or moment of ignition before engine TDC 22, 110 which decreases with increasing speed. A slight reduction of the idle speed causes a slight elevation of the advanced ignition, so that the idle speed is again raised to its original value.

In addition, a deviation of the idle speed in the direction toward higher speeds causes an attenuation of the engine force due to the slightly degressive curve of the ignition angle and the engine speed sinks again to its earlier value. The idle of the internal combustion engine is therefore kept at an engine speed in a self-regulating way and deviations of the engine speed are automatically corrected by the change of the ignition angle.

The self-regulating function may advantageously be stored as an exclusive function of the engine speed. It may also be advantageous if various moment of ignition curves are stored in the method for controlling the starting device, which may be changed between as a function of other variables. For example, the change between various moment of ignition curves may be performed as a function of input variables, such as acceleration and/or deceleration of the speed of the internal combustion engine, temperature of the internal combustion engine, exhaust gas temperature, exhaust gas composition, and/or similar variables.

Figure 5:
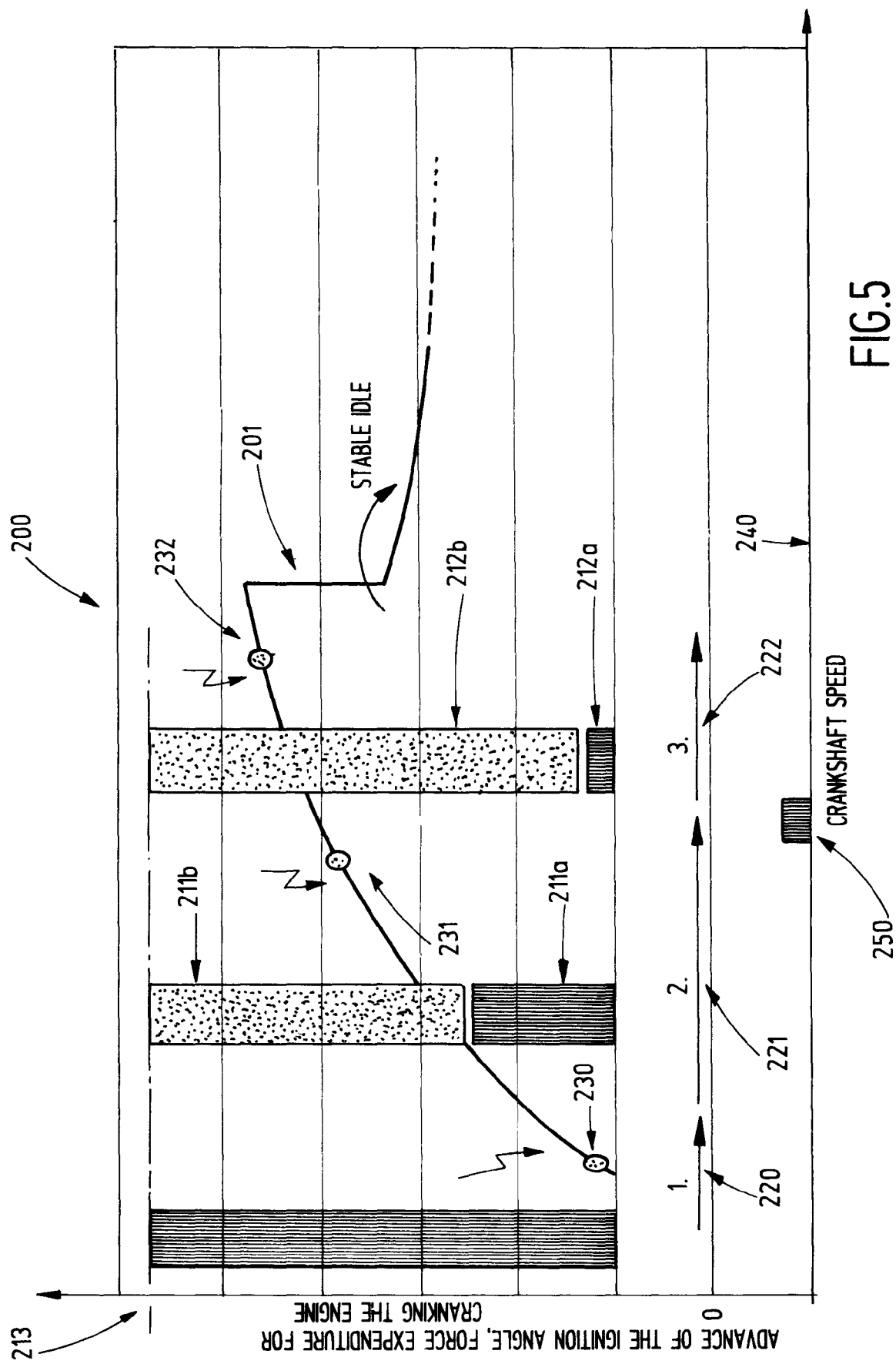
FIG. 5 shows a schematic illustration of the advance of the ignition angle and the force for cranking the engine as a function of the crankshaft speed.

FIG. 5 schematically shows a diagram 200 to illustrate the force ratios during the start of the internal combustion engine. A starting procedure by a cable pull starter using a method according to the present invention is shown as an illustration. The diagram shows the advance of the ignition angle and the force applied to crank the internal combustion engine as a function of the crankshaft speed. The line 201 shows the advance of the ignition angle and the bars 210, 211, 212 show the force expenditure during pulling of the cable pull starter. It may be seen that the angle of ignition already begins to rise to larger ignition angles before TDC significantly below the idle speed. At the beginning, the force expenditure 213 for cranking the internal combustion engine is to be applied completely by the cable pull starter, which is identified by the first bar 210. This all occurs during the first crank rotation 220. During the first crank rotation 220, the first ignition spark is triggered at 230. The crankshaft is thus somewhat accelerated. This causes the force for cranking the internal combustion engine to be distributed during the second crank rotation 221 onto a force component by the cable pull starter 211a and the force component because of the combustion in the internal combustion engine 211b. The advance of the ignition angle simultaneously rises. During the second crank rotation 221, an ignition spark 231 is triggered, which accelerates the crankshaft. This again causes the force for cranking the internal combustion engine to be distributed during the third crank rotation 222 onto a reduced force component by the cable pull starter 212a and an increased force component because of the combustion in the internal combustion engine 212b. The cable pull starter again has less force to apply. The speed threshold 250, which must be exceeded as a minimum speed for the successful engine start, is also thus exceeded. Simultaneously, the advance of the ignition angle again rises and the ignition spark 232 of the third crank rotation 222 accelerates the crankshaft further until the idle limit speed 240 is reached and the advance is lowered at speed 240, because the idle limit speed is exceeded and a stable idle is reached.

FIG. 6 shows a table in which the engine speed is shown in the left column and the ignition angle before engine TDC is shown in the right column. It may be seen that at 400 rpm, the ignition angle is still 0 but begins to rise to negative values. The ignition angle rises to values of −19° up to 2300 rpm until it decreases to −12° at 2300 rpm. The idle plateau extends from 2300 rpm to 4000 rpm. At this speed, the ignition angle sinks slightly from −12° to −9.5°, so that an idle self regulation may be implemented, as already described above. At speeds of 4000 rpm, the ignition angle again rises steeply in the transition to the work range and runs slightly rising up to 12,500 rpm, until the ignition angle sinks again to −10° at the end of the work range at 13,500 rpm.

Figure 7:
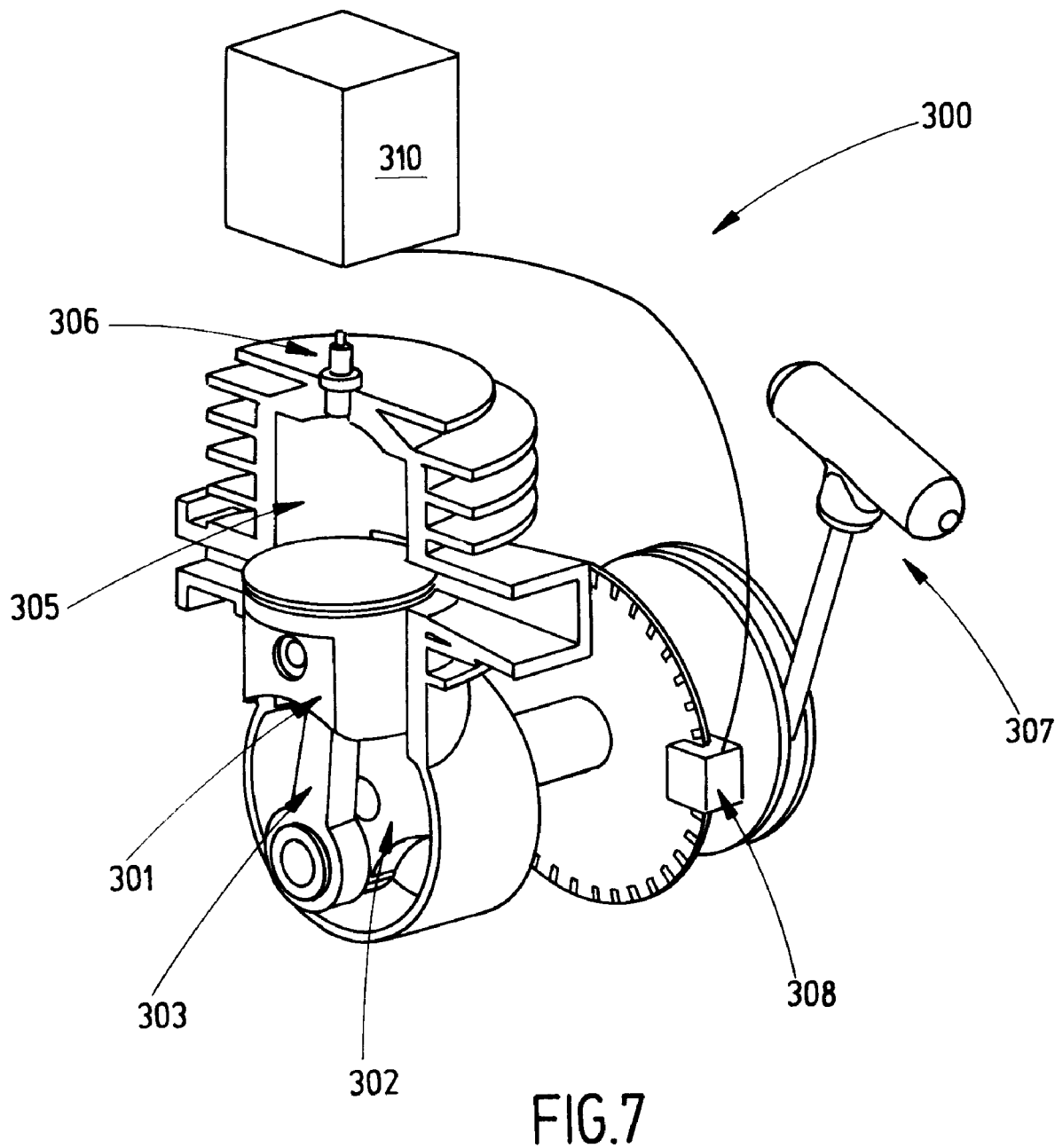
FIG. 7 shows a schematic illustration of a device according to the present invention.

FIG. 7 schematically shows an internal combustion engine 300 having piston 301, crankshaft 302, and connecting rod 303. The piston runs in the cylinder liner of the engine and compresses the fuel/air mixture introduced into the combustion chamber 305, which is ignited by an ignition spark of a spark plug 306. Furthermore, a cable pull of a cable pull starter 307 may be seen, using which the crankshaft of the internal combustion engine may be manually driven. A speed sensor 308 detects the crankshaft speed, also called the engine speed.

A device 310 is provided in the ignition for controlling the engine start, which controls the ignition sparks of the spark plug 306 as a function of the engine speed, inter alia. This device may control the moment of ignition according to the present invention as a function of the engine speed and possibly other variables.

The present invention may preferably be applied using cable pull starters for internal combustion engines in which elastic spring means are provided in the force path between a handle or a starter cable and a starting element of a cable pull starter or the crankshaft. Such starting devices having spring means are known, inter alia, from DE 203 19 902 U1, whose complete content, to avoid repetitions, is hereby expressly included in the content of the disclosure of the present application.

The present invention is not restricted to starting devices having cable pull starters, but rather may also be usable with other starting means. The present invention is also not restricted to internal combustion engines having only one cylinder, but rather may also be used with another number of cylinders, such as 2, 3, 4, 5, 6 etc.

LIST OF REFERENCE NUMERALS 1 reduction to zero
2 limit speed
3 plateau
4 jump
5 slow rise
6 plateau
7 rise
8 plateau
10 first range
11 progressive rise
20 second range
21 sudden reduction
22 reduction with increasing speed
30 idle range
40 acceleration range
41 sudden rise
42 slight increase
50 work range
51 plateau
100 progressive rise
101 steep drop
102 plateau
103 jump of the moment of ignition, transition to the work speed range
104 slow rise
105 plateau
110 sinking ignition angle advance with rising speed
200 diagram
201 diagram line 210 bar for force expenditure
211 bar for force expenditure
211a force component of the cable pull starter
211b force component by combustion
212 bar for force expenditure
212a force component of the cable pull starter
212b force component by combustion
213 force level for cranking the crankshaft
220 first crankshaft rotation
221 second crankshaft rotation
222 third crankshaft rotation
230 first ignition spark
231 ignition spark
232 ignition spark
240 idle limit speed
250 speed threshold
300 internal combustion engine
301 piston
302 crankshaft
303 connecting rod
305 combustion chamber
306 spark plug
307 cable pull of the cable pull starter
308 speed sensor
310 device for controlling the start of the internal combustion engine and the ignition

The invention claimed is:

1. A method for starting an internal combustion engine (300) using a starting device, an ignition spark of a spark plug (306), being controllable or producible as a function of the speed of the crankshaft by the starting device (310), characterized in that at speeds below the idle speed, a progressive rise (11) of the advance of the ignition angle before the top dead center of the crankshaft (302) of the internal combustion engine (300) occurs as a function of the crankshaft speed, which is followed at rising crankshaft speed by a sudden drop (21) of the advance of the ignition angle to a plateau (102) of the idle speed range, and upon further rising crankshaft speed, a sudden rise (41) of the advance of the ignition angle occurs in a work range (50) of the internal combustion engine, followed by a rise (42) implemented with rising speed provided that the ignition angle is advanced before top dead center of the crankshaft (302) at all speeds after starting the engine to prevent back kick.

2. The method of claim 1, characterized in that the plateau (102) of the advance of the ignition angle in the idle speed range is essentially constant.

3. The method according of claim 1, characterized in that the plateau (102) of the advance of the ignition angle in the idle speed range has a decreasing advance (22) of the ignition angle with rising crankshaft speed.

4. The method of claim 1, characterized in that the advance of the ignition angle rises at least slightly at least in the lower speed range of the work range (50).

5. The method of claim 1, characterized in that the advance of the ignition angle from small speeds occurring before the decrease to the idle range assumes approximately 1.5 to 2.5 times the value of the advance of the ignition angle in the idle range.

6. The method of claim 1, characterized in that the advance of the ignition angle from small speeds occurring before the decrease to the idle range assumes approximately 40% to 100% of the value of the advance of the ignition angle in the work range and advantageously assumes 70% to 90% of the value of the advance of the ignition angle in the work range.

7. The method of claim 1, characterized in that an ignition is activated at speeds below the idle speed and the advance of the ignition angle begins to deviate from zero at speeds in the range from approximately 100 rpm to 600 rpm.

8. The method of claim 1, characterized in that various moment of ignition curves are stored for controlling the starting device, which are changed between as a function of further input variables.

9. The method of claim 8, characterized in that a change between various moment of ignition curves is performed as a function of acceleration and/or deceleration of the speed of the internal combustion engine, temperature of the internal combustion engine, exhaust gas temperature, or exhaust gas composition.

10. A starting device (310) for starting an internal combustion engine (300) having a device for driving the crankshaft (302) of the internal combustion engine (300), a speed sensor (308), and at least one spark plug (306), characterized in that an ignition spark from the spark plug (306) is controllable or producible by the starting device (310) as a function of the speed of the crankshaft (302) as determined by the speed sensor (308), a progressive rise (11) of the advance of the ignition angle before the top dead center of the crankshaft (302) of the internal combustion engine (300) already occurring at speeds below the idle speed as a function of the crankshaft speed, which is followed upon rising crankshaft speed by a sudden drop (21) of the advance of the ignition angle to a plateau (102) of the idle speed range, and as the crankshaft speed rises further, the advance of the ignition angle suddenly rises (41) into a work range (50) of the internal combustion engine, followed by a rise (42) implemented with increasing speed provided that the ignition angle is advanced before top dead center of the crankshaft (302) at all speeds after starting the engine to prevent back kick.

11. The starting device of claim 10, characterized in that the plateau (102) of the advance of the ignition angle in the idle speed range is essentially constant.

12. The starting device of claim 10, characterized in that the plateau (102) of the advance of the ignition angle in the idle speed range has a decreasing advance (22) of the ignition angle with rising crankshaft speed.

13. The starting device of claim 10, characterized in that the advance of the ignition angle rises at least slightly at least in the lower speed range of the work range (50).

14. The starting device of claim 10, characterized in that the advance of the ignition angle from small speeds occurring before the decrease to the idle range assumes approximately 1.5 to 2.5 times the value of the advance of the ignition angle in the idle range.

15. The starting device of claim 10, characterized in that the advance of the ignition angle from small speeds occurring before the decrease to the idle range assumes approximately 40% to 100% of the value of the advance of the ignition angle in the work range and advantageously assumes 70% to 90% of the value of the advance of the ignition angle in the work range.

16. The starting device of claim 10, characterized in that an ignition is activated at speeds below the idle speed and the advance of the ignition angle begins to deviate from zero at speeds in the range from approximately 100 rpm to 600 rpm.

17. The starting device of claim 10, characterized in that various moment of ignition curves are stored for controlling the starting device, which are changed between as a function of further input variables.

18. The starting device of claim 17, characterized in that a change between various moment of ignition curves is performed as a function of acceleration and/or deceleration of the speed of the internal combustion engine, temperature of the internal combustion engine, exhaust gas temperature, or exhaust gas composition.

19. The starting device of claim 18, characterized in that a cable pull starter (307) is provided for manually rotating the crankshaft (301) of the internal combustion engine (300).

20. The starting device of claim 17, characterized in that a device is provided for manually rotating the crankshaft of the internal combustion engine.

21. The starting device of claim 20, characterized in that elastic spring means are provided in the transmission path or force path between a handle or a starter cable and a starting element of a cable pull starter or the crankshaft.

22. An internal combustion engine having a starting device according to claim 10.

* * * * *